UNITED STATES PATENT OFFICE.

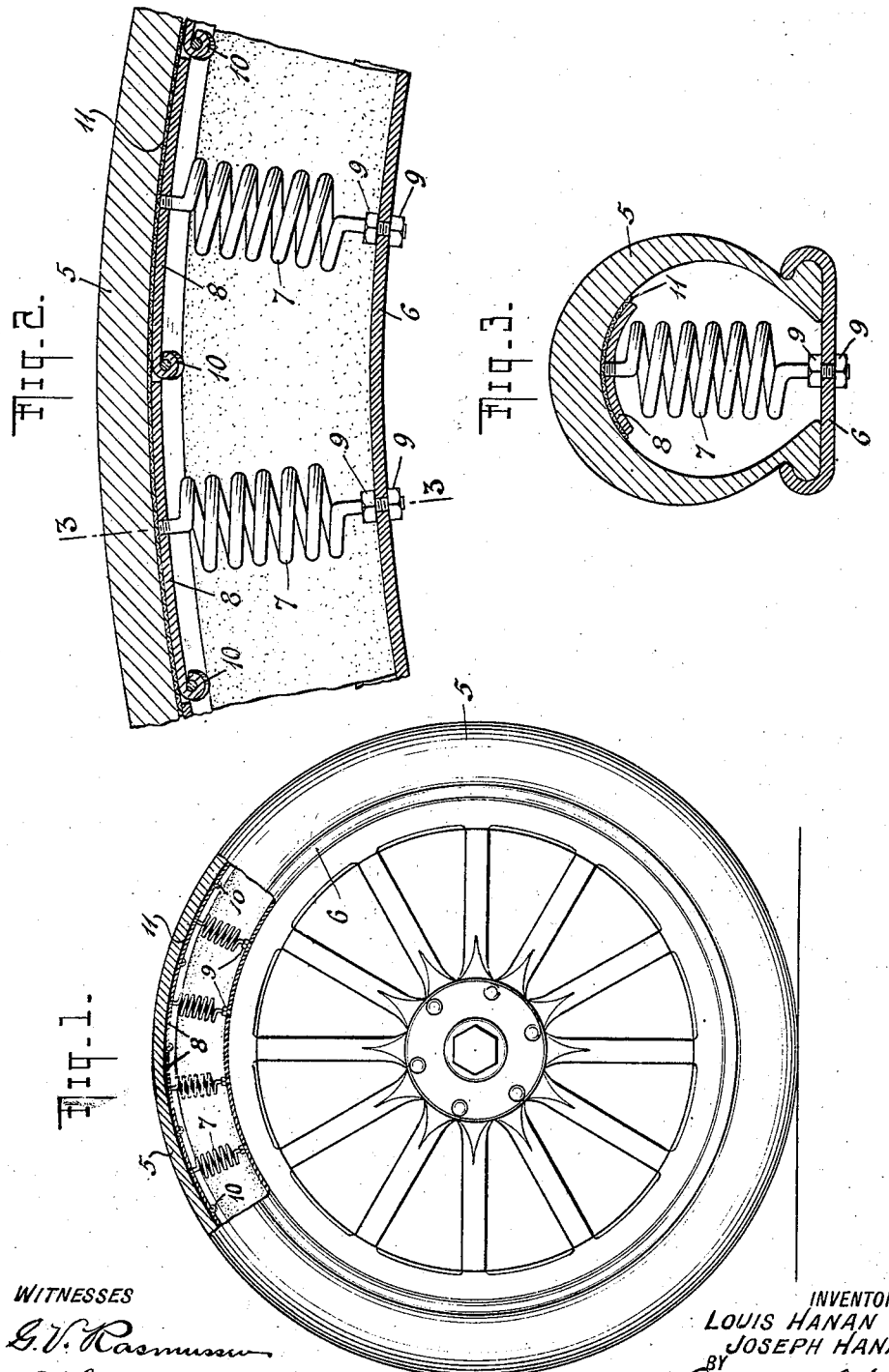

LOUIS HANAN AND JOSEPH HANAN, OF BROOKLYN, NEW YORK.

RESILIENT TIRE.

1,379,979. Specification of Letters Patent. Patented May 31, 1921.

Application filed December 10, 1920. Serial No. 429,651.

*To all whom it may concern:*

Be it known that we, LOUIS HANAN and JOSEPH HANAN, both citizens of Russia, and both residents of the borough of Brooklyn, county of Kings, city and State of New York, have invented certain new and useful Improvements in Resilient Tires, of which the following is a specification.

Our invention relates to tires and more particularly to resilient tires for automobiles and other self-propelled vehicles and has for its object the provision of a tire in which pneumatic or inflated elements subject to puncture are dispensed with and in which the resiliency of the tire is preserved in a novel and efficient manner. Other more specific objects of our invention will appear from the description hereinafter and the features of novelty will be pointed out in the appended claim.

In the accompanying drawings which illustrate a specific embodiment of the invention without defining its limits, Figure 1 is an elevation, partly in section, of a wheel equipped with our resilient tire; Fig. 2 is an enlarged longitudinal section of a portion of said tire and Fig. 3 is an enlarged cross-section on the line 3—3 of Fig. 2.

As shown in the illustrated example, our improved tire comprises a tube or casing 5 which may correspond in form and construction with the outer shoe of any customary pneumatic tire and which is similarly carried upon a rim 6; the latter may be of the well known demountable type or it may constitute a fixed part of the wheel without affecting the efficiency of the tire. The tube or casing 5 is maintained in a distended condition, corresponding to the inflated condition of a pneumatic tire, by means of a plurality of coil-springs 7 located at spaced intervals within said tube or casing 5. These springs 7 are under an outward radial tension and have their outer ends secured in any convenient manner to metal or other plates 8 and their inner ends fastened to the rim 6 for instance, by means of nuts 9. The plates 8 are arched transversely to fit the cross-sectional curve of the tube 5 and longitudinally to fit the circumferential curve thereof and in the operative combination of the parts lie in surface engagement with the inner surface of the tube 5 in registry with the tread thereof. The plates 8 are preferably hinged together in series as at 10 to form a complete circle within said tube 5; one or all of the pivots 10 may be made so as to provide for ready detachability of the plates in order to facilitate the assembling of the parts. As shown in Figs. 2 and 3, the plates 8 are of considerable length and width to provide adequate bearing surfaces for engagement with the tube and to reduce the possibility of injury thereto. If desired, a protecting layer of canvas or other suitable material 11 may be located between the tube 5 and plates 8 to prevent chafing of the tube and to reduce wear thereon.

Because of the multiplicity of springs and their disposition within the tube, the tire is expanded in substantially the same manner as in the case of an inflated tire and possesses an inherent resiliency whereby shocks of all degrees are efficiently neutralized. The improved tire is simple in construction and may be easily and quickly placed upon and removed from the rim and at the same time is economical and cheap to produce. Our new tire may be made to fit any size wheel on any type of vehicle and may be combined with existing wheels without requiring any material change therein and without requiring new wheels of special construction. If, for any reason, any part of the tire should become damaged or worn, the same may be replaced without difficulty and at low cost, thus making it unnecessary to discard the entire tire. The efficiency of the tire is not affected by punctures and blowouts and other tire troubles are entirely eliminated while at the same time the improved tire is capable of being successfully used far beyond the time when it becomes necessary to discard the ordinary pneumatic tire.

Various changes in the specific form shown and described may be made within the scope of the claim without departing from the spirit of our invention.

We claim:

The combination of a rim, a tire casing carried thereby, plates pivotally connected directly with each other in series and located within said casing, said plates being transversely and longitudinally arched in conformity with the cross-sectional and circumferential curves of said casing and fitting snugly against the inner face thereof, a plurality of springs located at spaced intervals within said casing and connected at their outer ends with said plates by being screwed into the same at central points and having their inner ends projecting through said rim at points in radial alinement with the points of connection with said plates, said springs being of substantially uniform circular form and having no contact with any part of said casing and exerting outward tensions in radial directions whereby said casing is resiliently expanded and nuts located upon said inner ends of said springs upon opposite sides of said rim whereby said springs are rigidly fixed in position.

In testimony whereof we have hereunto set our hands.

LOUIS HANAN.
JOE HANAN.